US008817637B2

(12) United States Patent
Hsu et al.

(10) Patent No.: US 8,817,637 B2
(45) Date of Patent: *Aug. 26, 2014

(54) APPARATUS, AND ASSOCIATED METHOD, FOR REQUESTING DATA RETRANSMISSION IN A PACKET RADIO COMMUNICATION SYSTEM

(75) Inventors: Liangchi Hsu, San Diego, CA (US); Mark W. Cheng, San Diego, CA (US)

(73) Assignee: Nokia Corporation, Espoo (FI)

( * ) Notice: Subject to any disclaimer, the term of this patent is extended or adjusted under 35 U.S.C. 154(b) by 1538 days.

This patent is subject to a terminal disclaimer.

(21) Appl. No.: 11/868,803

(22) Filed: Oct. 8, 2007

(65) Prior Publication Data

US 2008/0077838 A1    Mar. 27, 2008

Related U.S. Application Data

(63) Continuation of application No. 10/285,899, filed on Oct. 31, 2002, now Pat. No. 7,298,701.

(51) Int. Cl.
H04B 7/216 (2006.01)

(52) U.S. Cl.
USPC .......................................... 370/252; 370/235

(58) Field of Classification Search
None
See application file for complete search history.

(56) References Cited

U.S. PATENT DOCUMENTS

| | | | |
|---|---|---|---|
| 4,570,257 A | 2/1986 | Olson et al. | |
| 4,617,657 A | 10/1986 | Drynan et al. | |
| 4,779,274 A | 10/1988 | Takahashi et al. | |
| 4,841,526 A | 6/1989 | Wilson et al. | |
| 4,970,714 A | 11/1990 | Chen et al. | |
| 4,989,204 A | 1/1991 | Shimizu et al. | |
| 5,036,518 A | 7/1991 | Tseung | |
| 5,210,751 A | 5/1993 | Onoe et al. | |
| 5,410,536 A | 4/1995 | Shah et al. | |
| 5,563,895 A | 10/1996 | Malkamaki et al. | |
| 5,570,367 A | 10/1996 | Ayanoglu et al. | |
| 5,708,656 A | 1/1998 | Noneman et al. | |
| 5,717,689 A | 2/1998 | Ayanoglu | |

(Continued)

FOREIGN PATENT DOCUMENTS

| | | |
|---|---|---|
| CN | 1099919 | 3/1995 |
| CN | 1153479 C | 6/2004 |

(Continued)

OTHER PUBLICATIONS

International Search Report from PCT/IB2007/000836, dated Jan. 17, 2008.

(Continued)

Primary Examiner — Jay P Patel
(74) Attorney, Agent, or Firm — Alston & Bird LLP

(57) ABSTRACT

Apparatus, and an associated method, that reduces the occurrence of generation of redundant requests for retransmission of packet-formatted data, formatted at a physical layer and at a higher-logical layer, such as at an RLP layer. An estimate of an appropriate delay period is formed. The estimate is responsive to communication conditions in the communication system. When a data packet appears to have been inadequately delivered to the RLP logical layer, a DELAY_DETECTION_WINDOW timer is caused to time out the delay period estimated by the estimator. The request for retransmission, generated at the RLP layer, is permitted, upon expiration of the timer if the data packet has not yet been successfully delivered to the RLP layer and the transmitter has not given up the data packet delivery.

26 Claims, 4 Drawing Sheets

(56) References Cited

U.S. PATENT DOCUMENTS

| | | | |
|---|---|---|---|
| 5,751,708 A | 5/1998 | Eng et al. | |
| 5,784,362 A | 7/1998 | Turina | |
| 5,790,551 A | 8/1998 | Chan | |
| 5,793,744 A | 8/1998 | Kanerva et al. | |
| 5,930,233 A | 7/1999 | Kanerva et al. | |
| 5,931,964 A | 8/1999 | Beming et al. | |
| 5,956,329 A | 9/1999 | Pernice et al. | |
| 5,966,656 A | 10/1999 | Elkin et al. | |
| 6,031,818 A | 2/2000 | Lo et al. | |
| 6,069,883 A * | 5/2000 | Ejzak et al. | 370/335 |
| 6,122,504 A | 9/2000 | Niepel et al. | |
| 6,226,301 B1 * | 5/2001 | Cheng et al. | 370/474 |
| 6,330,451 B1 * | 12/2001 | Sen et al. | 455/452.2 |
| 6,385,456 B2 | 5/2002 | Menzel | |
| 6,473,399 B1 | 10/2002 | Johansson et al. | |
| 6,522,635 B1 | 2/2003 | Bedwell | |
| 6,556,550 B1 | 4/2003 | Rasanen | |
| 6,563,789 B1 | 5/2003 | Rasanen | |
| 6,584,089 B1 | 6/2003 | Honkasalo et al. | |
| 6,597,675 B1 | 7/2003 | Esmailzadeh et al. | |
| 6,654,422 B1 | 11/2003 | Khan et al. | |
| 6,717,916 B1 | 4/2004 | Ahn et al. | |
| 6,721,303 B1 | 4/2004 | Menzel et al. | |
| 6,757,245 B1 * | 6/2004 | Kuusinen et al. | 370/230 |
| 6,781,971 B1 * | 8/2004 | Davis et al. | 370/329 |
| 6,842,445 B2 | 1/2005 | Ahmavaara et al. | 370/349 |
| 6,987,780 B2 * | 1/2006 | Wei et al. | 370/469 |
| 7,054,316 B2 * | 5/2006 | Cheng et al. | 370/394 |
| 7,058,085 B2 * | 6/2006 | Earnshaw et al. | 370/473 |
| 7,096,261 B2 * | 8/2006 | Abrol et al. | 709/223 |
| 7,167,482 B1 | 1/2007 | Menzel et al. | |
| 7,200,115 B2 * | 4/2007 | Khan et al. | 370/236 |
| 7,502,385 B2 * | 3/2009 | Wei et al. | 370/469 |
| 7,778,287 B2 * | 8/2010 | Abrol et al. | 370/535 |
| 8,531,957 B2 * | 9/2013 | Abrol et al. | 370/235 |
| 2002/0141370 A1 * | 10/2002 | Abrol et al. | 370/338 |
| 2002/0185181 A1 * | 12/2002 | Weldon et al. | 137/630.19 |
| 2002/0191544 A1 * | 12/2002 | Cheng et al. | 370/236 |
| 2003/0012212 A1 * | 1/2003 | Earnshaw et al. | 370/428 |
| 2003/0028837 A1 * | 2/2003 | Oh | 714/748 |
| 2003/0214935 A1 * | 11/2003 | Khan et al. | 370/349 |
| 2003/0227875 A1 * | 12/2003 | Wei et al. | 370/252 |
| 2004/0009786 A1 | 1/2004 | Terry | |
| 2004/0013105 A1 * | 1/2004 | Ahmavaara et al. | 370/349 |
| 2004/0085943 A1 | 5/2004 | Hsu et al. | |
| 2004/0116143 A1 | 6/2004 | Love et al. | |
| 2005/0041581 A1 * | 2/2005 | Kuusinen et al. | 370/230 |
| 2005/0105511 A1 | 5/2005 | Poikselka | |
| 2005/0163161 A1 * | 7/2005 | Wei et al. | 370/469 |
| 2005/0207345 A1 | 9/2005 | Onggosanusi et al. | |
| 2005/0259687 A1 * | 11/2005 | Abrol et al. | 370/469 |
| 2006/0154603 A1 * | 7/2006 | Sachs et al. | 455/39 |
| 2006/0242529 A1 | 10/2006 | Terry et al. | |
| 2010/0284341 A1 * | 11/2010 | Abrol et al. | 370/328 |
| 2010/0284454 A1 * | 11/2010 | Oteri et al. | 375/224 |

FOREIGN PATENT DOCUMENTS

| | | |
|---|---|---|
| DE | 102 25 428 A1 | 12/2003 |
| EP | 418866 A2 | 3/1991 |
| EP | 0 475 698 | 3/1992 |
| EP | 0 719 016 | 6/1996 |
| EP | 0 730 382 | 9/1996 |
| EP | 0877513 A1 | 11/1998 |
| JP | 62159539 | 7/1987 |
| JP | 03011835 | 1/1991 |
| JP | 06112922 A | 4/1994 |
| KR | 2005-86716 A | 8/2005 |
| WO | WO 96/21984 | 7/1996 |
| WO | WO 96/36150 | 11/1996 |
| WO | WO 96/36154 | 11/1996 |
| WO | WO 97/12490 | 4/1997 |
| WO | WO 02/19604 A2 | 3/2002 |
| WO | WO 2004/047356 A2 | 6/2004 |

OTHER PUBLICATIONS

Tanenbaum, Andrew S., "Computer Networks" 1993, Prentice-Hall International, Inc., Englewood Cliffs, US XP002074002 196050, pp. 24-26 and 373-375.

"Automatic feedback retransmission in short wave data communication", No. 4, 1994, Communications Technology.

Tianfu et al., "Improving ARQ Performance and Dynamically Selecting Frame Size", No. 3, 1993, Computer Applications.

Shizhu et al., "Improvement on a Selective Repeat Scheme", vol. 22, No. 11, Journal of Huazhong University of Science and Technology, Nov. 1994.

Chuah et al., "Performance Comparisons of Two Retransmission Protocols for CDMA", Conference Title: 1996 IEEE 46th Vehicular Technology Conference, Mobile Technology for the Human Race (Cat. No. 96CH35894), Part vol. 1, pp. 272-276, 1996.

Non Final Rejection issued Jun. 23, 2010 in corresponding Korean Application No. 10-2008-7024537.

Kim T. Chang, Multi-link Multi-flow Packet Application, Oct. 24, 2005, 103 pages.

Non-Final Office Action dated Mar. 18, 2009 of related U.S. Appl. No. 11/400,838.

Non-Final Office Action dated Jun. 22, 2009 of related U.S. Appl. No. 11/400,838.

Final Office Action dated Dec. 4, 2009 of related U.S. Appl. No. 11/400,838.

Advisory Action dated Feb. 2, 2010 of related U.S. Appl. No. 11/400,838.

Notice of Allowance mailed Sep. 23, 2010 of corresponding U.S. Appl. No. 11/400,838, filed Apr. 7, 2006.

\* cited by examiner

APPARATUS, AND ASSOCIATED METHOD, FOR REQUESTING DATA RETRANSMISSION IN A PACKET RADIO COMMUNICATION SYSTEM

CROSS-REFERENCE TO RELATED APPLICATIONS

This application is a continuation of U.S. patent application Ser. No. 10/285,899 filed Oct. 31, 2002 now U.S. Pat. No. 7,298,701 which is hereby incorporated herein in its entirety by reference.

BRIEF SUMMARY OF THE INVENTION

The present invention relates generally to a manner by which to coordinate retransmission requests in a packet-based communication system. The communication system utilizes more than one packet-formatting layer, each of which uses a packet retransmission scheme, such as a packet radio communication system that utilizes an RLP (radio link protocol) layer positioned upon a lower-layer that utilizes H-ARQ (hybrid automatic request) packet retransmissions. More particularly, the present invention relates to apparatus, and an associated method, by which selectively to delay RLP, or other, retransmission requests at that layer to provide more time at the lower-layer for the lower-layer retransmission scheme to be carried out. Prior to sending the higher logical-layer retransmission request, a delay time is required to elapse. If, upon timing-out of the delay time, data is not adequately received, the RLP, or other higher logical-layer, retransmission request is sent. And, the delay time is a selectable value, selected responsive to indicia associated with communications in the communication system.

Improved communication efficiency is provided as redundant retransmission requests, originated at different logical-layers defined in the communication system, to request retransmission of the same data are less likely to be generated.

BACKGROUND OF THE INVENTION

A communication system is used to communicate data between two, or more, separate positions, or entities. In a minimal implementation, a communication system is formed of a first communication station forming a sending station and a second communication station, forming a receiving station. The communication stations are interconnected by way of a communication channel. Data to be communicated by the first communication station is converted, if necessary, into a form to permit its communication upon the communication channel to the second communication station. And, the second communication station operates to detect the data communicated thereto and to recover the informational content thereof.

A wide variety of different types of communication systems have been developed and are regularly utilized to effectuate communication of the data between the communication stations. And, new types of communication systems, as well as improvements to existing communication systems, have been made possible as a result of advancements in communication technologies.

A radio communication system is exemplary of a type of communication system that has benefited from advancements in communication technologies. In a radio communication system, the communication channel formed between the communication stations operable therein is defined upon a radio link. As a radio link is utilized upon which to define the communication channel, the need otherwise to utilize a wireline connection extending between the communication stations to define communication channels is obviated. Reduced infrastructure costs are therefore generally associated with radio communication systems. And, a radio communication system can be implemented to form a mobile communication system.

A cellular communication system is exemplary of a radio communication system that has been made possible due to advancements in communication technologies. A cellular communication system provides for radio communications with mobile stations to permit the telephonic communication to be effectuated therefrom. A cellular communication system is installed throughout a geographical area through the use of spaced-apart base transceiver stations, each of which define a portion of the geographical area, referred to as a cell. When a mobile station is within the cell defined by a base transceiver station, communications are generally effectuable with the base transceiver station that defines the cell.

Communications are handed-off between successive base transceiver stations when the mobile station travels out of one cell and into other cells, defined by others of the base transceiver stations. Through appropriate positioning of the base transceiver stations and permitting communication hand-offs to successive ones of the base transceiver stations, only relatively low-powered signals need to be generated during telephonic communications between the mobile station and the base transceiver station. As a result, the same channels can be used at different locations of the same cellular communication system. Relatively efficient usage of the frequency spectrum allocated to a cellular communication system is thereby possible.

Cellular communication systems are constructed, generally, to operate according to an operational specification set forth by a standard body, such as the EIA/TIA. Successive generations of cellular communication systems, incorporating technological advancements, as available, have been defined by operational specifications. First generation and second-generation systems have achieved significant levels of usage, and installation of third-generation and successor-generation systems have been proposed.

Third-generation systems provide for multi-rate data communication services that utilize packet-formatted data. A so-called CDMA 2000 standard is an exemplary third generation communication system, intended to provide such multi-data rate communication services utilizing communication of packet-formatted data.

Structure, and functionality, defined in the proposed CDMA 2000 system is defined in terms of logical layers. Other communication systems are analogously defined in such terms. In a CDMA 2000 system, multiple formatting layers are set forth. And, in particular, an RLP (radio link protocol) layer is positioned above a physical layer. The RLP layer utilizes an RLP retransmission scheme while the physical layer utilizes an HARQ (hybrid-automatic request) retransmission scheme. The retransmission schemes define retransmission protocols by which a receiving station selectively requests retransmission of a packet of data upon failure of successful delivery of the data packet to the receiving station. Because retransmission schemes are provided for separate layers, retransmission requests might be sent by both the RLP layer as well as at the physical layer. Such redundancy of retransmission requests are counterproductive to a goal of efficient radio spectrum usage.

A manner is needed by which to reduce the possibility that the multiple layers of a receiving station might redundantly request retransmission of a data packet.

It is in light of this background information related to communications in a packet radio communication system that the significant improvements of the present invention have evolved.

SUMMARY OF THE INVENTION

The present invention, accordingly, advantageously provides apparatus, and an associated method, by which to coordinate retransmission requests in a packet-based communication system. The packet-based communication system utilizes more than one packet-formatting layer, each layer utilizing a packet retransmission scheme, such as a packet radio communication system that utilizes an RLP (radio link protocol) layer positioned upon a lower-level layer that utilizes HARQ.

Through operation of an embodiment of the present invention, a manner is provided by which selectively to delay RLP, or other higher, logical layer, retransmission requests, at that layer to provide more time at the lower layer for the lower-layer retransmission scheme to be carried out.

The higher logical-layer retransmission request is delayed by a delay time. If, upon expiration of the delay time, data is not adequately received, the RLP, or other higher logical-layer, retransmission request is sent.

As the possibility that redundant retransmission requests, generated at separate logical layers, is reduced, improved communication efficiency in the communication system is possible. That is to say, multiple retransmission requests, originated at different logical-layers defined in the communication system, that request retransmission of the same data is reduced.

In one aspect of the present invention, an estimate is made of a suggested time delay of the delay time by which to delay the retransmission request by the higher logical-layer. The estimate is formed responsive to indicia associated with communication conditions in the communication system. The indicia is formed, for instance, of traffic load information indicative of ongoing traffic, i.e., communications, in the communication system, HARQ information associated with active communications, QoS (quality of service) requirements of active, or anticipated, communications in the communication system, communication quality indicative of communication quality of communication activity in the communication system, as well as other types of radio quality information.

The estimation is formed, in one implementation, at the network part of the radio communication system and communicated to the mobile station whereat the mobile station stores the estimation value. And, in another implementation, the estimation is made at the network part of the communication system, communicated to the mobile station whereat the mobile station selectively modifies, or substitutes, an altered estimation value therefore.

In another aspect of the present invention, the estimation defines a delay period bounded by an upper value, a lower value, and a suggested value. When data appears at an RLP layer, or other higher-logical-layer, to have been unsuccessfully delivered thereto, a delay period of a delay time within the range of values defined by the delay period is required to expire prior to generation of the retransmission request.

In another aspect of the present invention, a receiving station, such as a mobile station, that receives packet-formatted data during a communication session, includes a timer called DELAY_DETECTION_WINDOW (DDW) which is capable of timing-out a selected delay time. When the RLP, or other higher logical-layer, of the receiving station fails adequately to receive a data packet, the DDW timer is started. If the packet is not adequately received at the receiving station by the time that the timer times-out, the retransmission request is generated by the RLP, or other higher logical-layer. The delay is instituted to provide an additional time period to permit a lower logical-layer, such as a physical layer, HARQ retransmissions scheme, to effectuate the retransmission of the data packet.

In one implementation, a retransmission scheme is provided for a cellular communication system constructed, generally, to be operable pursuant to a CDMA 2000 operational specification. The operational specification provides for high-speed, multi data rate communications. The data communications are, for instance, pursuant to a 1xEV-DV packet data service scheme. The communication system is defined in terms of logical layers that include, amongst others, a physical layer and an RLP (radio link protocol) layer positioned thereabove. The base transceiver station includes estimator functionality thereof. The estimator forms an estimate of a suggested RLP layer retransmission delay period. The delay period defines a time period by which a retransmission request is suggested to be delayed at the RLP layer upon determination that a data packet has not successfully been delivered thereto. Once the estimate is formed, an RLP Block of Bits (BLOB) containing an RLP-delay indication is sent by the base station to the mobile station, or other receiving station. And, once delivered to the receiving station, the values contained in the RLP-delay message are extracted and used to set the time-out value of a timer formed thereat. Upon an indication that an RLP layer packet is not successfully delivered to the RLP layer of the mobile station, or other receiving station, a request for retransmission of the packet is delayed until the DDW timer times-out. If, upon expiration of the period timed by the timer, the RLP data packet is not successfully delivered to the RLP layer of the mobile station, a retransmission request is generated. Note that the retransmission request can be generated prior to the expiration of the DDW timer if the mobile station determines that the base transceiver station has given up the delivery of the missing RLP data packet.

Because the generation of the retransmission request is delayed for a time period corresponding to the suggested, or otherwise responsive to, the estimated time delay, the possibility that redundant retransmission requests, generated at separate logical layers of the receiving station, is reduced.

In these and other aspects, therefore, apparatus, and an associated method, is provided for a radio communication system. The radio communication system is operable to communicate packet-formatted data between a first communication station and a second communication station. The packet-formatted data is formatted at a first logical layer, utilizing a first-layer acknowledgment mechanism by which the second communication station selectably acknowledges whether the packet formatted data is adequately received thereat at the first logical layer. And, the packet-formatted data is formatted at a second logical layer, utilizing a second-layer acknowledgement mechanism by which the second communication station selectably acknowledges whether the packet-formatted data is adequately received thereat at the second logical layer. Efficient usage of the radio capacity in the radio communication system is facilitated. An estimator is coupled to receive indicia associated with communication characteristics of the first logical layer. The estimator estimates a selected second-layer delay period by which to delay generation, at the second communication station, of a second-layer resend request requesting resending of the packet-formatted data.

A more complete appreciation of the present invention and the scope thereof can be obtained from the accompanying drawings that are briefly summarized below, the following detailed description of the presently-preferred embodiments of the invention, and the appended claims.

DETAILED DESCRIPTION

Figure 1:
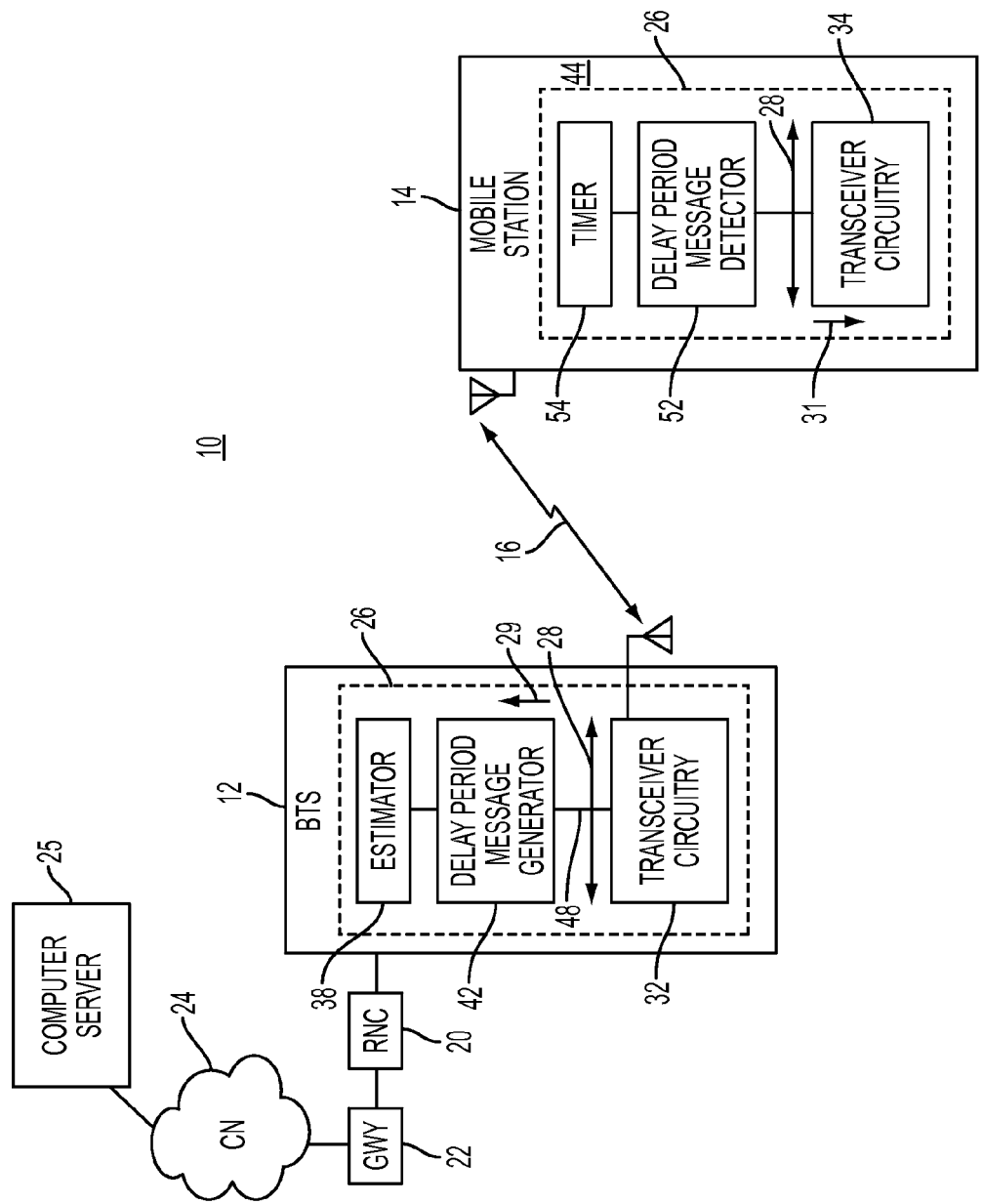
FIG. 1 illustrates a functional block diagram of a communication system in which an embodiment of the present invention is operable.

Referring first to FIG. 1, a communication system, shown generally at 10, provides for the communication of data between spaced-apart communication stations, here a base transceiver station 12 and a mobile station 14. Communication channels are defined upon radio links 16 extending between the base transceiver station and the mobile station. Data that is communicated by a base transceiver station to the mobile station is communicated upon forward-link channels defined upon the radio links. And, data communicated by the mobile station is communicated upon reverse-link channels defined upon the radio links.

In the exemplary implementation shown in the figure, the communication system 10 forms a cellular communication system operable, generally, pursuant to a proposed, CDMA 2000 operational specification that provides for high-data rate communication services, such as 1xEV-DO communication services. In other implementations, other types of data services, such as 1XTREME and L3NQS data services proposed for the CDMA 2000 operational specification are instead provided. And, in other implementations, the communication system 10 is representative of cellular communication systems that provide data services pursuant to other operational specifications as well as other types of packet-based communication systems. Accordingly, while the following detailed description shall describe operation of an embodiment of the present invention with respect to its implementation in a CDMA 2000 system that provides 1xEV-DV data communication services, the present invention is analogously implementable in cellular, and other, communication systems operable pursuant to other communication schemes.

The base transceiver station 12 forms a portion of a radio access network, here also shown to include a radio network controller (RNC) 20, and a gateway (GWY) 22.

The gateway provides for a connection of the radio access network to a core network (CN) 24, such as a PSTN (public-switched, telephonic network) or PDN (packet data network), e.g., a next-generation telephone system or the internet backbone.

Communications devices, such as computer servers 25, are connected to the PDN. Data sourced at a computer server, connected to the core network, is supplied to the mobile station 14 by the formation of a communication path between the data source and the mobile station that extends through the core network, the radio access network, and a radio link 16 extending to the mobile station. Data sourced at a computer server, or other data source, provide a communication service, such as a data broadcast, to the mobile station.

The data is formatted pursuant to packet formatting schemes, here at multiple, logical layers defined in the system. Here, the logical layers include, amongst others, a physical layer and an RLP (radio link protocol) layer positioned, functionally, thereabove. Packet formatting is performed at both the physical layer and at the RLP layer. And, both of the layers utilize a retransmission scheme in which packets of data are retransmitted if the data packets are not successfully delivered to the intended communication station. Here, for instance, data packets sent by the base transceiver station 12 to the mobile station 14 are positively acknowledged by the mobile station to be received adequately thereat. Otherwise, the data packet is resent by the base transceiver station. Because of the multiple layers of formatting and corresponding multiple layers of retransmissions that might be requested, redundant retransmission requests might well be generated. Through operation of an embodiment of the present invention, the generation of the redundant retransmission requests is less likely to occur.

Accordingly, in the exemplary implementation, the base transceiver station includes apparatus 26 of an embodiment of the present invention. The apparatus 26 includes functional entities that are shown in block form in the figure. The entities forming the apparatus 26 are implementable in any desired manner such as, for example, by algorithms executable at processing circuitry. The entities of the apparatus 26 are formed at the RLP layer of the base transceiver station. The RLP layer is formed of entities positioned above a physical layer. Portions of the base transceiver station positioned above the segment 28 form parts of higher logical-layers of the base transceiver station. And, elements of the base transceiver station shown below (as shown) of the base transceiver station form the physical layer thereof. Here, the physical layer is shown to include the transceiver circuitry 32 of the base transceiver station.

Analogously, the mobile station includes further apparatus 26 of an embodiment of the present invention. Again, the entities forming the apparatus 26 positioned at the mobile station are functionally represented and can be implemented in any desired manner, such as by algorithms executable by processing circuitry. The elements of the apparatus are formed at higher logical-layers of the mobile station, here also represented to be positioned above (as-shown), the line segment 28, designated at 29. The physical layer of the mobile station is formed of entities positioned beneath (as-shown) of the segment 28, designated at 31. Here, the physical layer includes transceiver circuitry 34 of the mobile station.

The apparatus 26 formed at the base transceiver station is here shown to include an estimator 38 and a delay period message generator 42 coupled thereto. The estimator is coupled to receive communication indicia, herein indicated functionally by way of lines 48 representative of communication characteristics in the communication system. The indicia is formed, for instance, of one or more of indicia types, such as, for example, traffic loading in the communication system, HARQ information of active users in the communication system, QoS requirements associated with the users, and radio quality information associated with the users in the communication system. Additionally, communication indicia input to the estimator further selectably include historical data associated with delay times in the communication system, such as historical values of estimates performed during operation of the estimator.

Responsive to values of the communication indicia provided thereto, the estimator operates to form values of delay periods that a subsequent request for retransmission of a data packet at the RLP layer should be delayed. The delay period, in one implementation, forms a single, suggested RLP delay. And, in another implementation, the delay period is formed of a range of possible values, bounded by minimum and maximum delay times and including a suggested RLP delay time within the delay period so-defined. The delay period message generator operates to generate a message for communication to the mobile station to report on the estimate made by the estimator. The message formed by the message generator is provided to the transmit part of the transceiver circuitry 32, thereafter to be broadcast by way of a forward link channel to the mobile station. In the exemplary implementation, the delay period message generated by the message generator forms an RLP Block of Bits (BLOB) that includes an RLP-delay (min, max, suggested) field.

When the message is received at the mobile station, the message is provided, here by way of the line 48, to the apparatus 26. And, more particularly, the values of the RLP delay message are provided to a delay period message detector 52. The detector operates to detect, and extract values of, the delay period message therefrom and to provide the values to a DELAY_DETECTION_WINDOW (DDW) timer 54 to which the detector is coupled. Upon subsequent detection at the RLP layer of inadequate delivery thereto of a data packet, the timer is caused to time a time period corresponding to the delay period detected by the detector prior to generation of a RLP-layer request for retransmission of the data packet. Upon expiration of the time period timed by the DDW timer, if the data packet is not adequately delivered to the mobile station, the RLP-layer request for retransmission is generated. It should be noted that the mobile station may use several techniques to determine if the base station has given up or missed the delivery of the missing data packet. For example, the mobile station may detect that, after retransmitting an old packet several times unsuccessfully, the base station kicks off sending a new packet with a new sequence number. Hence, the MS can assume the old packet is given up and missed. If the mobile determines that the base station has given up or missed the delivery of the missing RLP data packet, the mobile station may generate the request for the retransmission prior to the expiration of DDW timer.

The physical layer utilizes an HARQ retransmission scheme. During the delay timed by the timer 54, the HARQ retransmission procedures are selectably performed, to cause retransmission of the data packet at the physical layer. The HARQ elements 54, formed at the transceiver circuitry are representative of such HARQ retransmission functions.

Figure 2:
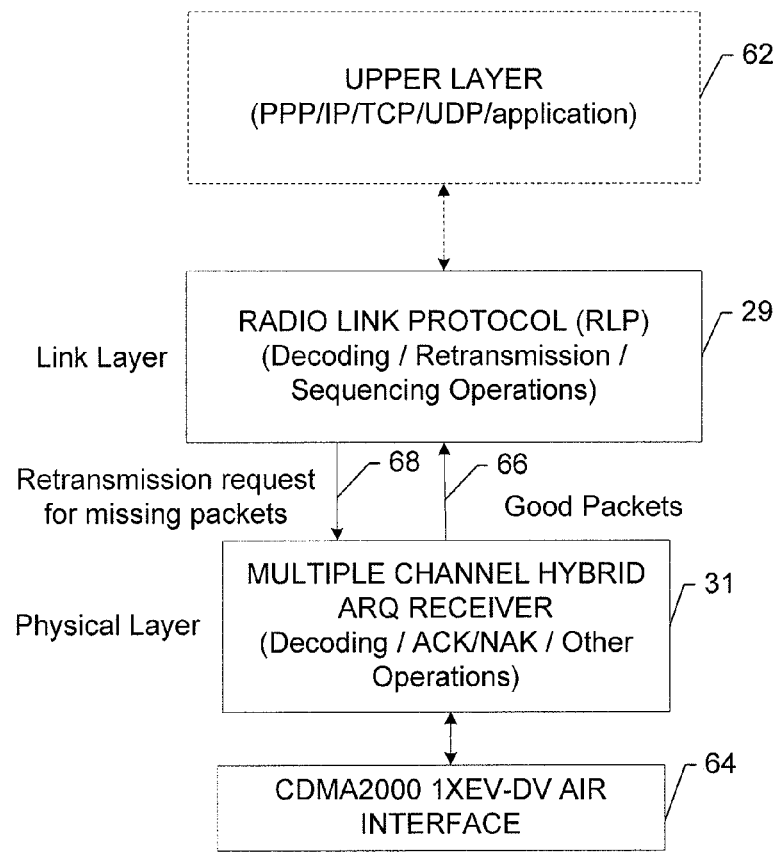
FIG. 2 illustrates a functional representation of two logical layers of portions of the communication system shown in FIG. 1.

FIG. 2 illustrates a logical-layer representation of parts of the communication system 10 shown in FIG. 1. Here, the RLP layer 29 forming the link layer is positioned above the physical layer 31. The RLP layer functions, amongst other things, to perform decoding, retransmission, and sequencing operations. And, the physical layer performs decoding, ACK/NAK, and other operations.

Upper layers of the communication system are represented at the block 62 here including, for instance, PPP/IP/TCP (UDP) application layers, all conventionally utilized in packet communication systems. And, positioned beneath the physical layer 31 is the CDMA 2000 1xEV-DV air interface 64.

Segments 66 and 68 are representative of passage of good packets from the physical layer to the link layer and retransmission requests for missing packets provided by the link layer to the physical layer.

Figure 3:
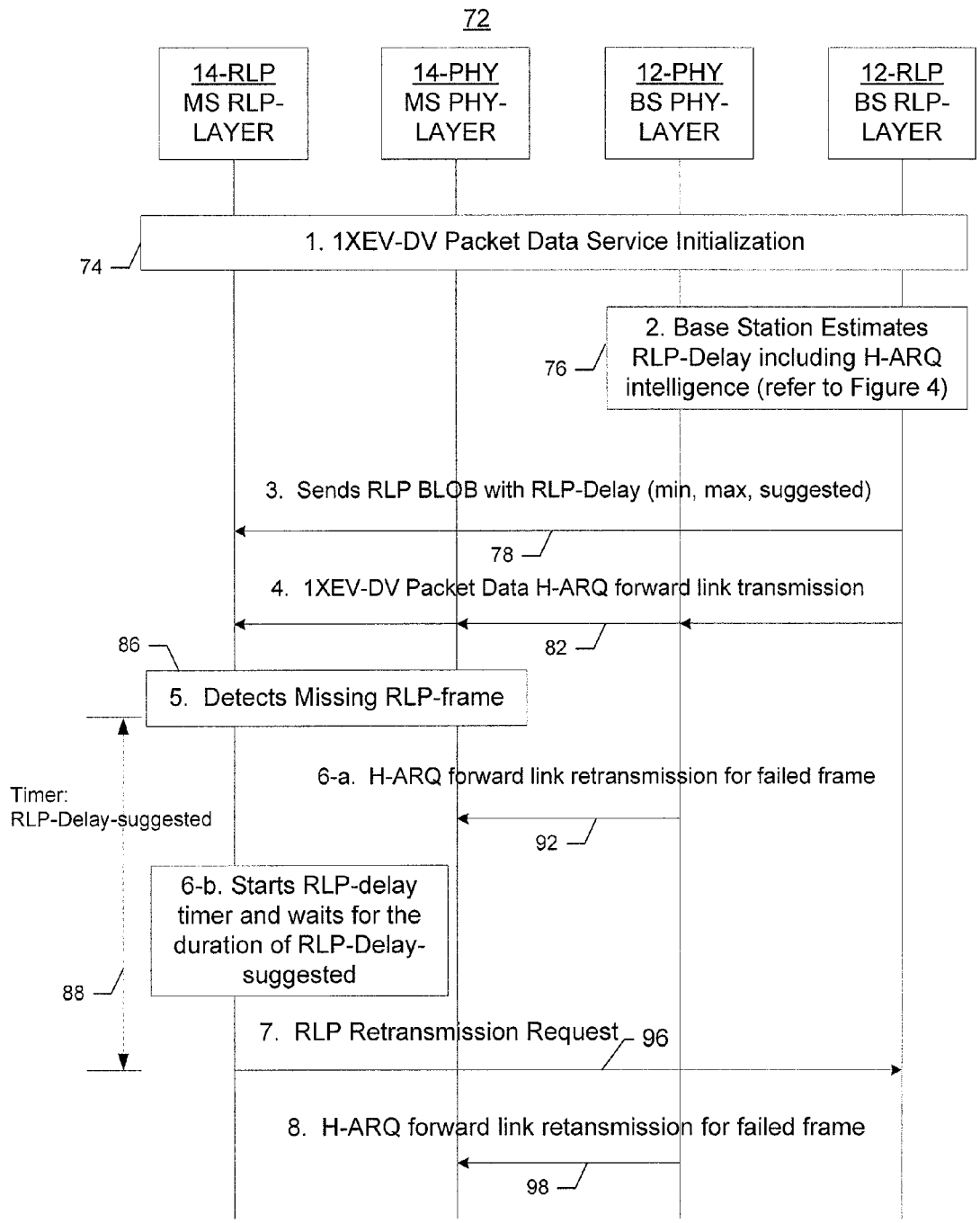
FIG. 3 illustrates a message sequence diagram listing the signaling generated during operation of an embodiment of the present invention forming a portion of the communication system shown in FIGS. 1 and 2.

FIG. 3 illustrates a message sequence diagram, shown generally at 72, representative of signaling generated during operation of the apparatus 26 that forms a portion of the communication system 10, shown in FIG. 1. Here, the base transceiver station 12 and the mobile station 14 are separated into logical-layer parts. That is to say, the base transceiver station is here designated by 12-RLP and 12-PHY to designate the RLP and physical layers, respectively. And, analogously, the mobile station 12 is represented by the physical layer 14-PHY and the RLP layer 14-RLP, respectively.

First, and as indicated by the block 74, packet data service initialization procedures pursuant to, here, formation of a 1xEV-DV communication session are performed. Then, and as indicated by the block 76, an estimator positioned at the base transceiver station estimates values of an RLP-delay responsive, for instance, to H-ARQ values, or other communication indicia. And, as indicated by the segment 78, the delay period message, here forming an RLP BLOB containing an RLP-delay (min, max, suggested) values is sent to the mobile station. The contents of the message are provided to the RLP layer 14-RLP of the mobile station. And, subsequently, as indicated by the segments 82, 1xEV-DV packet data, utilizing an HARQ retransmission scheme, is broadcast from the base transceiver station to the mobile station, here delivered to the RLP-layer 14-RLP thereof.

To show operation of an embodiment of the present invention, a determination is made at the block 86, that an RLP frame has not been successfully delivered to the RLP layer of the mobile station. Rather than immediately generating a retransmission request from the RLP layer, the DDW timer 54 (shown in FIG. 1) is instead started. The timer times for the delay time period indicated in the RLP BLOB earlier transmitted to the mobile station and, here, extends for a time period corresponding to the length of the arrow 88.

During the period that the RLP-layer timer is timing the delay period, physical layer HARQ retransmissions can be effectuated. And, here, indicated by the segment 92, a retransmission of an undelivered frame is effectuated. Upon expiration of the timer, if the data packet is not adequately delivered to the RLP layer, the RLP retransmission request is generated. Here, the retransmission request is indicated by the segment 96 that is communicated from the RLP layer 14-RLP of the mobile station to the RLP layer 12-RLP of the base transceiver station. Subsequently, the data packet is retransmitted, indicated by the segment 98.

Figure 4:
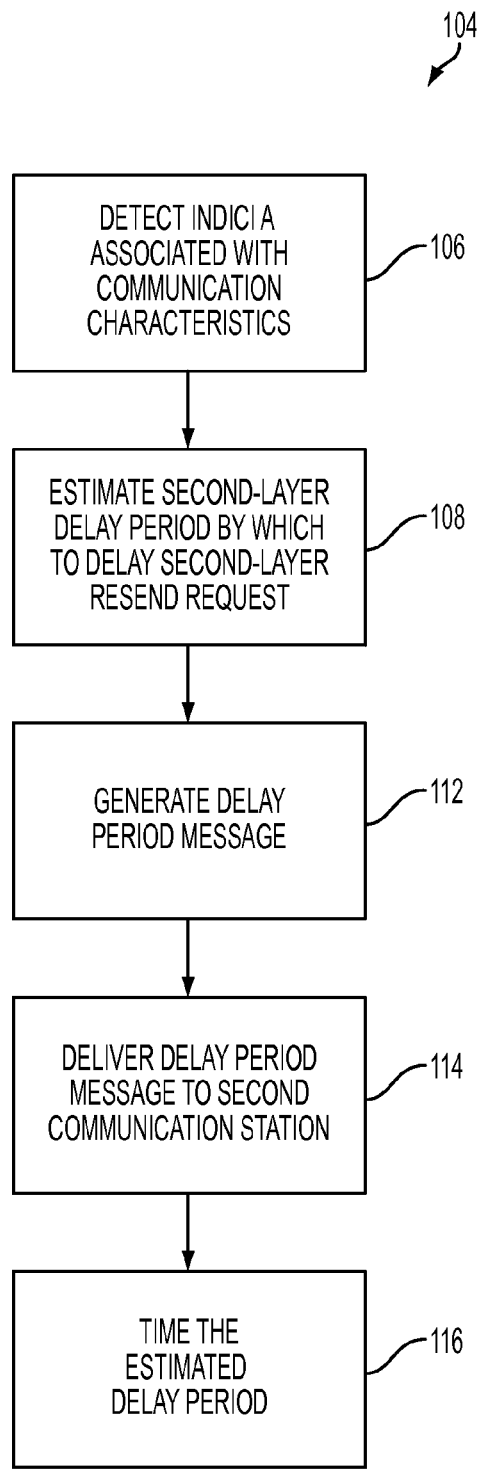
FIG. 4 illustrates a method flow diagram listing the method of operation of an embodiment of the present invention.

FIG. 4 illustrates a method, shown generally at 104, of the method of operation of an embodiment of the present invention. The method facilitates efficient usage of radio capacity in a radio communication system that utilizes retransmission schemes at two, or more, logical layers by which the elements of the communication system are defined.

First, and as indicated by the block 106, indicia associated with communication characteristics in the communication system are detected. Then, and as indicated by the block 108, a selected second-layer delay period by which to delay generation, at a second communication station, of a second-layer resend request requesting resending of the packet-formatted data is estimated. The estimate is formed responsive to the indicia detected during the operation of detecting set forth at the block 106.

Thereafter, and as indicated by the block 112, a delay period message is generated. The delay period message contains a value of the selected second-layer delay period. And, as indicated by the block 114, the delay period message is delivered to the second communication station. And, thereafter, indicated by the block 116, a time period is timed. Time period is indicated by the value contained in the delay period message when the packet formatted data fails to be adequately delivered to the second logical layer of the second communication station.

Because of the use of delay period to delay the generation of the second logical layer retransmission request, the possibility that redundant requests, generated at both the physical layer and at the higher logical-layer is reduced.

The previous descriptions are of preferred examples for implementing the invention, and the scope of the invention should not necessarily be limited by this description. The scope of the present invention is defined by the following claims:

We claim:

1. An apparatus comprising: processing circuitry; and
a storage device comprising algorithms, the processing circuitry configured to execute the algorithms, which causes the apparatus to:
enable transmission of packet formatted data formatted at a first logical layer comprising a lower layer, utilizing a first-layer acknowledgement mechanism and enable transmission of the packet formatted data at a second logical layer comprising an upper layer that is higher than the lower layer, utilizing a second-layer acknowledgment mechanism; and
generate an estimate of a selected second logical layer delay period, in response to received indicia, by which to delay generation of a second logical layer resend request requesting resending of the packet formatted data in an instance in which a determination reveals that the packet formatted data is unsuccessfully delivered to a second logical layer of a terminal, wherein the estimate of the selected second logical layer delay period is a fixed delay period based in part on the received indicia that is associated with communication characteristics corresponding to radio quality information of a communication system, the estimate of second logical layer delay period is generated prior to sending of the second logical layer resend request.

2. The apparatus of claim 1, wherein the estimate comprises one or more values which correspond to one or more delay periods by which to delay generation of the second-layer resend request.

3. The apparatus of claim 2, wherein the one or more delay periods comprise a minimum delay time, a maximum delay time and a suggested delay time.

4. The apparatus of claim 2, wherein the one or more values are used to time a time period corresponding to the delay period.

5. The apparatus of claim 4, wherein the processing circuitry for execution of stored algorithms is further configured to cause the apparatus to:
receive the second-layer resend request upon expiration of the time period.

6. The apparatus of claim 5, wherein the processing circuitry for execution of stored algorithms is further configured to cause the apparatus to:
retransmit the packet formatted data to the second logical layer of the terminal.

7. The apparatus of claim 4, wherein the processing circuitry for execution of stored algorithms is further configured to cause the apparatus to:
receive a first-layer resend request requesting resending of the packet-formatted data during the time period.

8. The apparatus of claim 7, wherein the processing circuitry for execution of stored algorithms is further configured to cause the apparatus to:
retransmit the packet formatted data to the first logical layer of the terminal.

9. The apparatus of claim 1, wherein the second logical layer comprises a radio link protocol (RLP) layer and the first logical layer comprises a physical layer.

10. The apparatus of claim 1, wherein the first-layer acknowledgment mechanism comprises a hybrid automatic request (H-ARQ) retransmission and the second-layer acknowledgement comprises a radio link protocol (RLP) retransmission.

11. The apparatus of claim 1, wherein the second logical layer comprises a layer that is higher than the first logical layer.

12. The apparatus of claim 1, wherein the characteristics comprise information relating to the first logical layer.

13. The apparatus of claim 1, wherein the characteristics comprise data relating to hybrid automatic request (H-ARQ) information.

14. The apparatus of claim 1, wherein the radio quality information comprises at least one of traffic load information associated with communications in the communication system, hybrid automatic request information associated with the communications in the communication system or quality of service requirements of the communications in the communications system.

15. A method comprising:
enabling transmission of packet formatted data formatted at a first logical layer comprising a lower layer, utilizing a first-layer acknowledgement mechanism and enabling transmission of the packet formatted data at a second logical layer comprising an upper layer that is higher than the lower layer, utilizing a second-layer acknowledgment mechanism; and
generating, via processing circuitry, an estimate of a selected second logical layer delay period, in response to received indicia, by which to delay generation of a second logical layer resend request requesting resending of the packet formatted data in an instance in which a determination reveals that the packet formatted data is unsuccessfully delivered to a second logical layer of a terminal,
wherein the estimate of the selected second logical layer delay period is a fixed delay period based in part on the received indicia that is associated with communication characteristics corresponding to radio quality information of a communication system the estimate of the selected second logical layer delay period is generated prior to sending of the second logical layer resend request.

16. The method according to claim 15, wherein the estimate comprises one or more values which correspond to one or more delay periods by which to delay generation of the second-layer resend request.

17. The method of claim 16, wherein the one or more delay periods comprise a minimum delay time, a maximum delay time and a suggested delay time.

18. The method of claim 16, wherein the one or more values are used to time a time period corresponding to the delay period.

19. The method of claim 18, further comprising, receiving the second-layer resend request upon expiration of the time period.

20. The method of claim 16, further comprising, receiving a first-layer resend request requesting resending of the packet-formatted data during the time period.

21. The method of claim 16, wherein the characteristics comprise information relating to the first logical layer.

22. The method of claim 15, wherein the radio quality information comprises at least one of traffic load information associated with communications in the communication system, hybrid automatic request information associated with the communications in the communication system or quality of service requirements of the communications in the communications system.

23. An apparatus comprising:
processing circuitry; and
a storage device comprising algorithms, the processing circuitry configured to execute the algorithms, which causes the apparatus to:
receive packet formatted data, the packet formatted data formatted at a first logical layer comprising a lower layer, utilizing a first-layer acknowledgment mechanism;
selectably acknowledge whether the packet formatted data is accurately received thereat at the first logical layer and, the packet formatted data formatted at a second logical layer comprising an upper layer that is higher than the lower layer, utilizing a second-layer acknowledgement mechanism;
selectably acknowledge whether the packet formatted data is accurately received thereat at the second logical layer; and
receive an estimate of a selected second logical layer delay period by which to delay generation of a second logical layer resend request requesting resending of the packet-formatted data, the estimate of the selected second logical layer delay period is a fixed delay period based in part on received indicia associated with communication characteristics corresponding to radio quality information of a communication system, the second logical layer delay period is generated prior to sending of the second logical layer resend request.

24. The apparatus of claim 23, wherein the radio quality information comprises at least one of traffic load information associated with communications in the communication system, hybrid automatic request information associated with the communications in the communication system or quality of service requirements of the communications in the communications system.

25. An apparatus comprising:
processing circuitry; and
a storage device comprising algorithms, the processing circuitry configured to execute the algorithms, which causes the apparatus to:
receive packet formatted data, the packet formatted data formatted at a first logical layer comprising a lower layer, utilizing a first-layer acknowledgement mechanism;
selectably acknowledge whether the packet formatted data is accurately received thereat at the first logical layer and, the packet formatted data formatted at a second logical layer comprising an upper layer that is higher than the lower layer, utilizing a second-layer acknowledgement mechanism;
selectably acknowledge whether the packet formatted data is accurately received thereat at the second logical layer;
receive and detect a delay period message, the delay period message having an indicia associated with a selected second logical layer delay period;
receive indications of the indicia associated with the selected second logical layer delay period contained in the delay period message; and
time a time period indicated by the received indicia in an instance in which the packet formatted data appears to be inaccurately delivered to the second logical layer of the apparatus, and
wherein the time period is based in part on the received indicia that is associated with communication characteristics corresponding to radio quality information of a communications system, the second logical layer delay period is a fixed delay period and is generated prior to sending of a second logical layer resend request requesting resending of the packet formatted data.

26. The apparatus of claim 25, wherein the radio quality information comprises at least one of traffic load information associated with communications in the communication system, hybrid automatic request information associated with the communications in the communication system or quality of service requirements of the communications in the communications system.

* * * * *